US008146640B2

(12) United States Patent
Cartabbia (10) Patent No.: US 8,146,640 B2
(45) Date of Patent: Apr. 3, 2012

(54) HEMMING SYSTEM AND METHOD FOR HEMMING A FABRIC WITHOUT USING SEAMS, BY INTRODUCING AN ADHESIVELY PROCESSED RESILIENT ELEMENT INTO ONE OR TWO OPPOSITE SURFACES OF THE FABRIC

(75) Inventor: Giovanni Cartabbia, Palazzolo sull'Oglio (IT)

(73) Assignee: MACPI-Pressing Division S.p.A., Palazzolo Sull'Oglio (Brescia) (IT)

( * ) Notice: Subject to any disclaimer, the term of this patent is extended or adjusted under 35 U.S.C. 154(b) by 863 days.

(21) Appl. No.: 11/810,094

(22) Filed: Jun. 4, 2007

(65) Prior Publication Data

US 2008/0196643 A1     Aug. 21, 2008

(30) Foreign Application Priority Data

Feb. 16, 2007  (IT) .............................. MI2007A0300

(51) Int. Cl.
| | |
|---|---|
| B29C 65/02 | (2006.01) |
| B29C 65/50 | (2006.01) |
| B32B 37/06 | (2006.01) |
| B32B 38/04 | (2006.01) |
| B32B 41/00 | (2006.01) |
| B32B 43/00 | (2006.01) |
| B30B 15/34 | (2006.01) |

(52) U.S. Cl. ........ 156/361; 156/436; 156/437; 156/438; 156/443; 156/498; 156/499; 156/511; 156/582; 156/583.1

(58) Field of Classification Search .................. 156/247, 156/249, 250, 253, 258, 267, 308.2, 309.6, 156/309.9, 344, 361, 433, 436, 437, 438, 443, 498, 499, 510, 511, 519, 522, 523, 578, 584, 582, 583.1; 83/301, 326, 327, 556, 591, 623, 694; 38/104; 223/27, 28, 37, 38, 50

See application file for complete search history.

(56) References Cited

U.S. PATENT DOCUMENTS

| | | | | | |
|---|---|---|---|---|---|
| 3,415,706 | A | * | 12/1968 | Ettre ............................... | 156/540 |
| 3,650,873 | A | * | 3/1972 | Smith et al. .................... | 156/465 |
| 3,660,200 | A | * | 5/1972 | Anderson et al. .............. | 156/278 |
| 3,720,565 | A | * | 3/1973 | Cavanna ........................ | 156/497 |
| 4,095,538 | A | * | 6/1978 | Rockerath et al. ............ | 112/147 |
| 4,120,740 | A | * | 10/1978 | Morgan et al. ................ | 156/522 |
| 4,990,213 | A | * | 2/1991 | Brown et al. .................. | 156/425 |
| 5,326,520 | A | * | 7/1994 | Franck et al. ............... | 264/173.1 |
| 2004/0094008 | A1 | * | 5/2004 | Tada ................................ | 83/556 |
| 2005/0274460 | A1 | * | 12/2005 | Cartabbia ..................... | 156/391 |

FOREIGN PATENT DOCUMENTS

JP            05140520 A  *  6/1993

OTHER PUBLICATIONS

Englsih abstract of JP 05-140520.*

* cited by examiner

*Primary Examiner* — Sing P Chan
(74) *Attorney, Agent, or Firm* — Hedman & Costigan, P.C.; James V. Costigan (57) ABSTRACT

A hemming system for hemming a fabric, without using seams, and by introducing an adhesively processed element into a surface or between two opposite surfaces of the fabric, comprises an adhesive applying module for applying two adhesive materials to an elastic or resilient element and to the fabric, and a second hemming module, for hemming the fabric at the resilient element.

13 Claims, 10 Drawing Sheets

HEMMING SYSTEM AND METHOD FOR HEMMING A FABRIC WITHOUT USING SEAMS, BY INTRODUCING AN ADHESIVELY PROCESSED RESILIENT ELEMENT INTO ONE OR TWO OPPOSITE SURFACES OF THE FABRIC

BACKGROUND OF THE INVENTION

The present invention relates to a hemming system and method for hemming a fabric, without using seams, by introducing an adhesively processed elastic or resilient element into a surface or two opposite surfaces of the fabric.

The inventive system has been specifically designed to hem a fabric material, without performing seaming operations on the latter, while simultaneously providing an elasticized hem, adapted to provide the fabric material with a perfect elastic recovery property, allowing the elasticized fabric hem to be recovered to its starting position as a pulling or tension force applied to the resilient fabric hem is removed.

The above mentioned result, in particular, cannot be obtained, as it should be apparent to one skilled in the art, by using available single or multiple layer prior adhesive materials.

Multiple-layer adhesive materials and, in particular, three layer adhesive materials which, at least theoretically, would provide the fabric hems made thereby with a full recovery property, are already known.

In actual practice, the above mentioned adhesive materials, as they have been subjected to the required hemming temperature and pressure, are so modified that they cannot assure a recovery to the starting conditions of the fabric material.

This drawback causes a fabric material article made by the thus processed prior adhesive materials, to be undesirably elongated, with a consequent loss of its resilient and wearing properties.

SUMMARY OF THE INVENTION

Accordingly, the aim of the present invention is to provide such a hemming system and method, for hemming a fabric, without using seams, by introducing an adhesively processed resilient element into a surface, or two opposite surfaces, of said fabric, thereby allowing to overcome the above mentioned drawbacks of the prior art and providing very good results.

Within the scope of the above mentioned aim, a main object of the invention is to provide such a system and method which are operatively very flexible and adapted to allow a user to perform several types of hemming operations.

Yet another object of the present invention is to provide a cloth article, made from the above fabric material, having cloth article hems which are substantially improved, from an aesthetic and operating standpoint, with respect to prior fabric hems.

According to one aspect of the present invention, the above mentioned aim and objects, as well as yet other objects, which will become more apparent hereinafter, are achieved by a system for hemming a fabric, without using seams, by introducing an adhesively processed resilient element into a surface or two opposite surfaces of said fabric, characterized in that said method comprises a first adhesive applying module for applying two adhesive materials to said resilient element and said fabric, and a second hemming module, to hem said fabric at said resilient element.

BRIEF DESCRIPTION OF THE DRAWINGS

Further characteristics and advantages of the present invention will become more apparent hereinafter from the following detailed disclosure of a preferred, though not exclusive, embodiment of the invention, which is illustrated, by way of an indicative but not limitative example, in the accompanying drawings, where.

DESCRIPTION OF THE PREFERRED EMBODIMENTS

With reference to the number references of the above mentioned figures, the hemming system according to the present invention comprises a first adhesive applying module or unit, generally indicated by the reference number 1, for applying two adhesive materials to an elastic or resilient element and to the fabric, and a second hemming module or unit, generally indicated by the reference number 2, for hemming said fabric at said resilient or elastic element.

Figure 1:
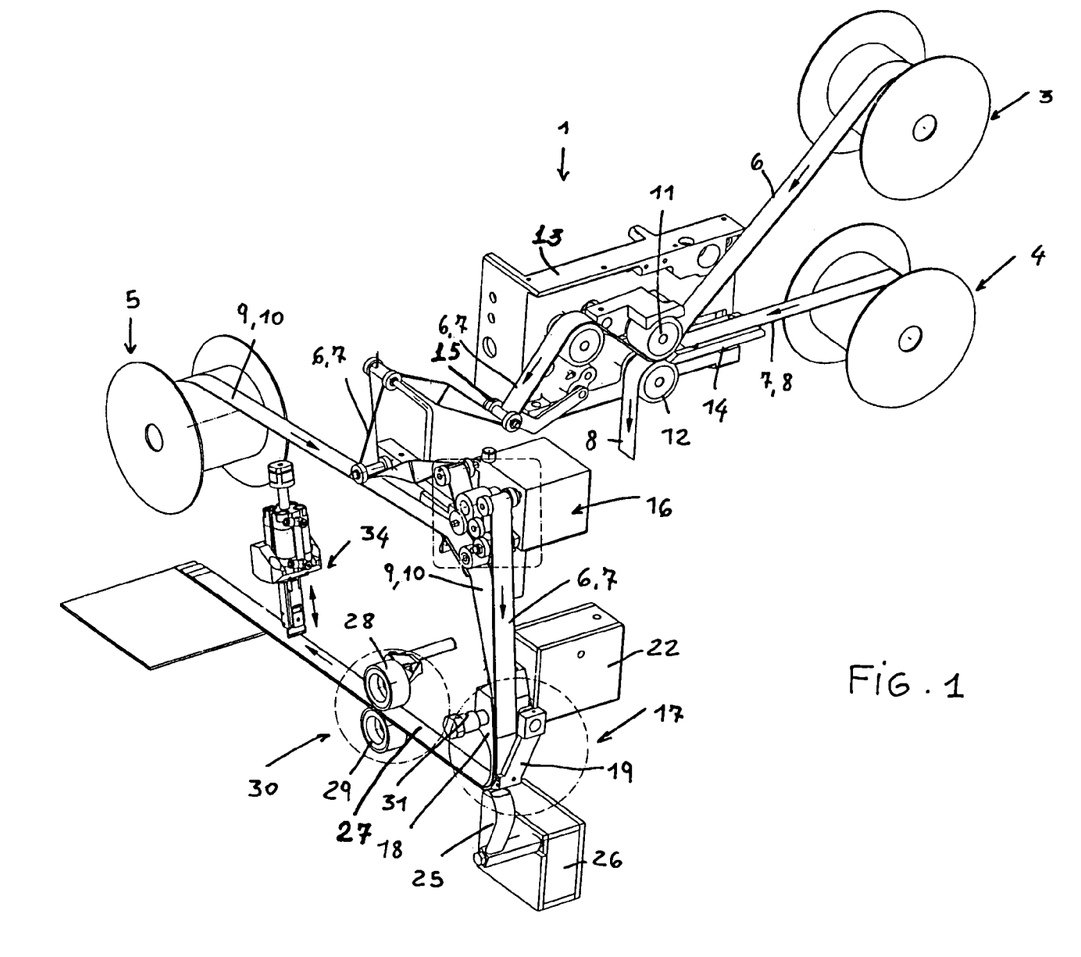
FIG. 1 is a schematic perspective view showing the first adhesive applying module or unit included in the hemming system according to the present invention.

The first adhesive applying module 1 comprises three bobbins, that is: a first bobbin 3 supporting a resilient or elastic element 6, a second bobbin 4 supporting a first adhesive material 7 including a silicone processed protective paper layer 8, and a third bobbin 5 supporting a second adhesive material or layer 9, including a respective protective silicone processed paper material 10.

The two first bobbins 3 and 4, supporting said adhesive material or layer 7 and said resilient element 6, allows the latter to be properly supplied, said adhesive material 7 and resilient element 6 being hot-coupled at a pair of pressing rollers 11 and 12 of a first adhesive applying device 13.

It should be pointed out that the coupling is performed by a hot coupling operation.

More specifically, the adhesive web or layer 7 is so conveyed as to contact a heated plate 14, which is heated to a variable temperature, depending on the type of the adhesive material being used, said temperature being preferably from 70° C. to 200° C.

Said pressing roller pair 11 and 12 provides a firm connection of said resilient fabric element 6 and adhesive material 7, to provide an integral unit.

After having connected or coupled the two above mentioned materials, the protective silicone processed paper material 8 covering the adhesive layer is removed.

After having coated the resilient element 6, either fully or partially, by the adhesive material layer 7, said resilient element 6 is conveyed to a swinging roller 15, designed for removing possible working stresses as caused by the resilient element during preliminary processing operations.

Figure 2:
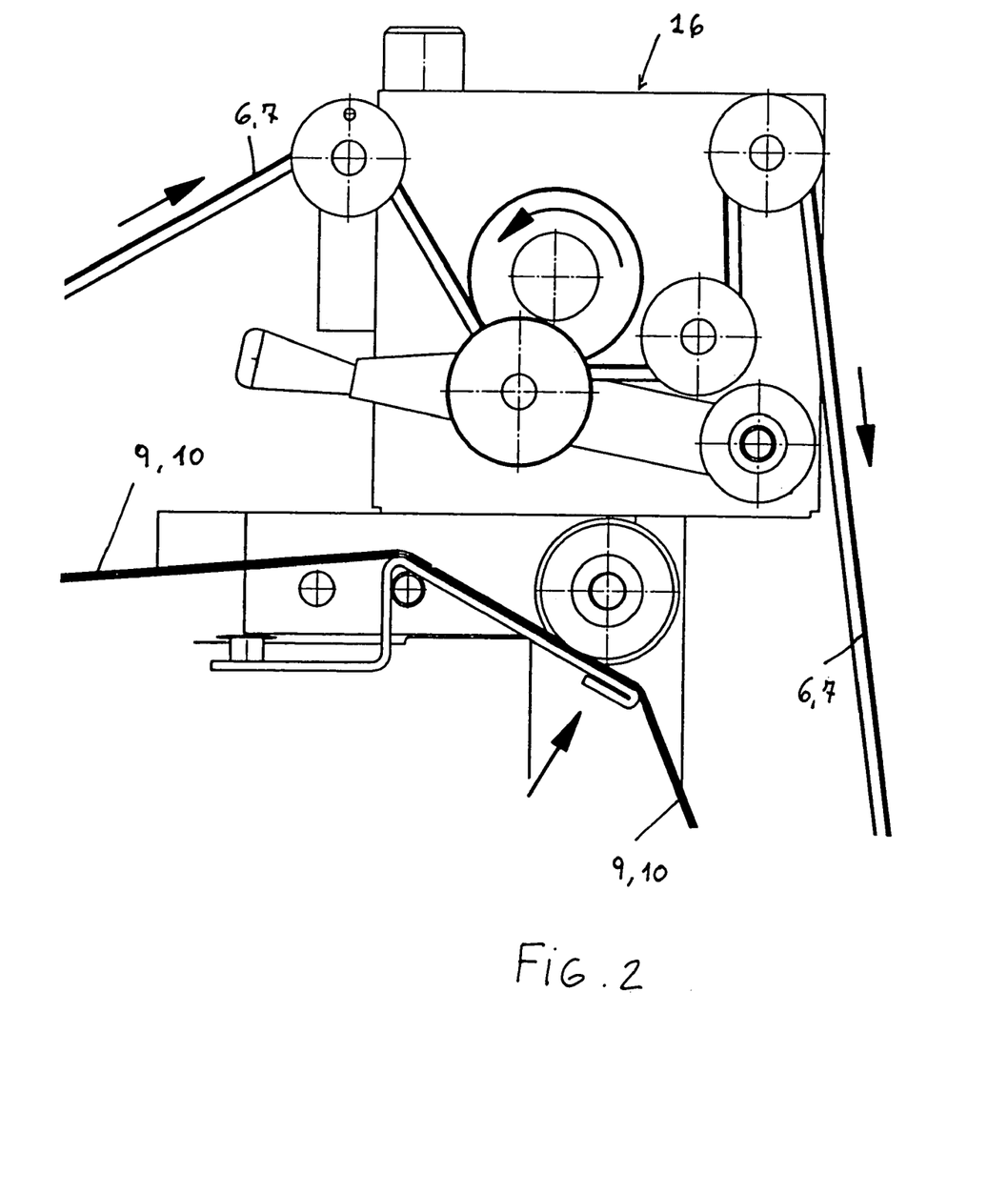
FIG. 2 is a side elevation view illustrating the programmable tensioning or pulling device of the first adhesive applying module or unit.
Figure 3:
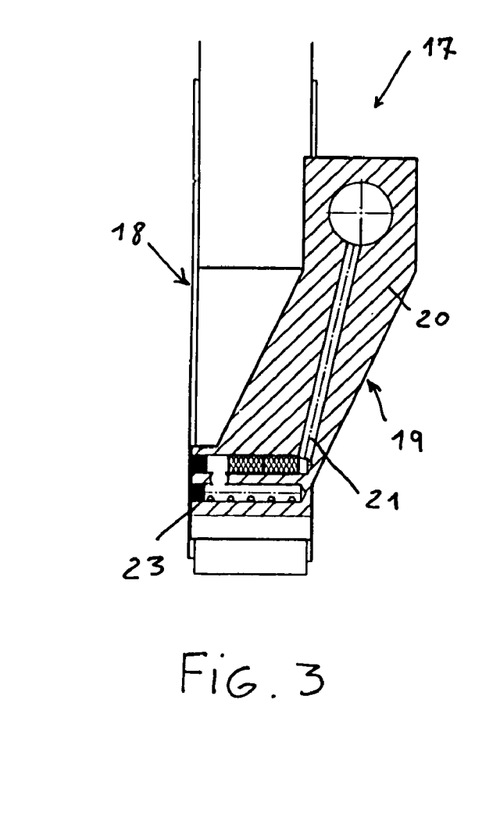
FIG. 3 is a front elevation view, as partially cross sectioned, showing the adhesive applying module or device.
Figure 4:
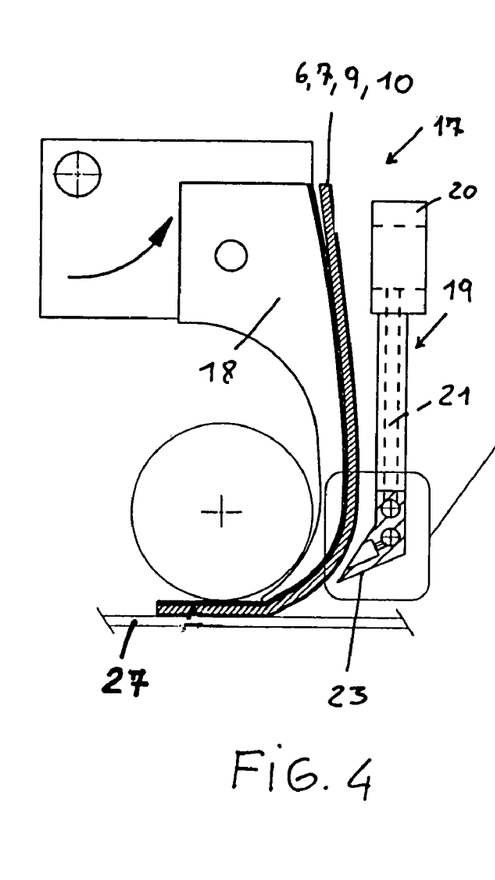
FIG. 4 is a further side elevation view, partially cross-sectioned, illustrating the adhesive applying module or device.

Then, the adhesive processed resilient element is conveyed to a programmable tensioning or pulling device 16, which subject said resilient element to an adjustable pulling force, which in turn will prove a desired restrained force, after having applied the fabric material to be hemmed to the resilient element.

Then, the second adhesive strip 9 is brought to contact the adhesive processed resilient element or strip 6, 7, at a hot applying device, generally indicated by the reference number 17.

The applying device 17, in particular, comprises a hot guide 18, where a top hot air delivery device 19 is arranged.

Figure 5:
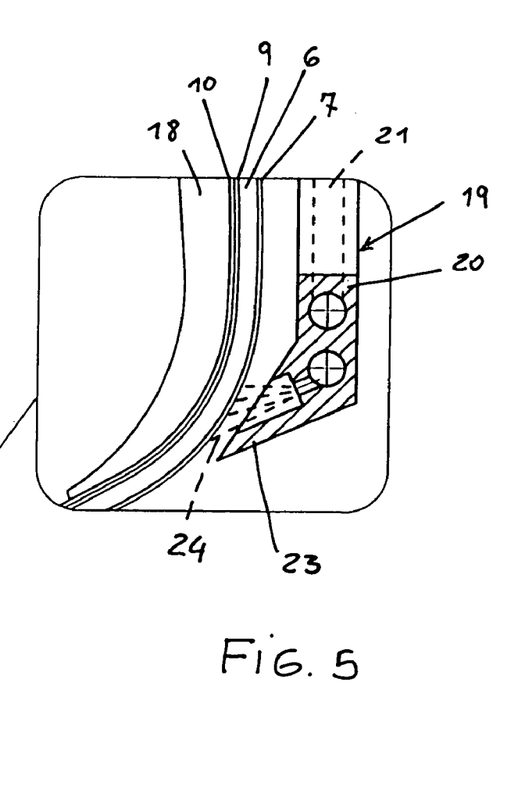
FIG. 5 is a further schematic view, on an enlarged scale, with respect to the preceding figures, showing details of a top hot air delivery device associated with the adhesive applying module.
Figure 6:
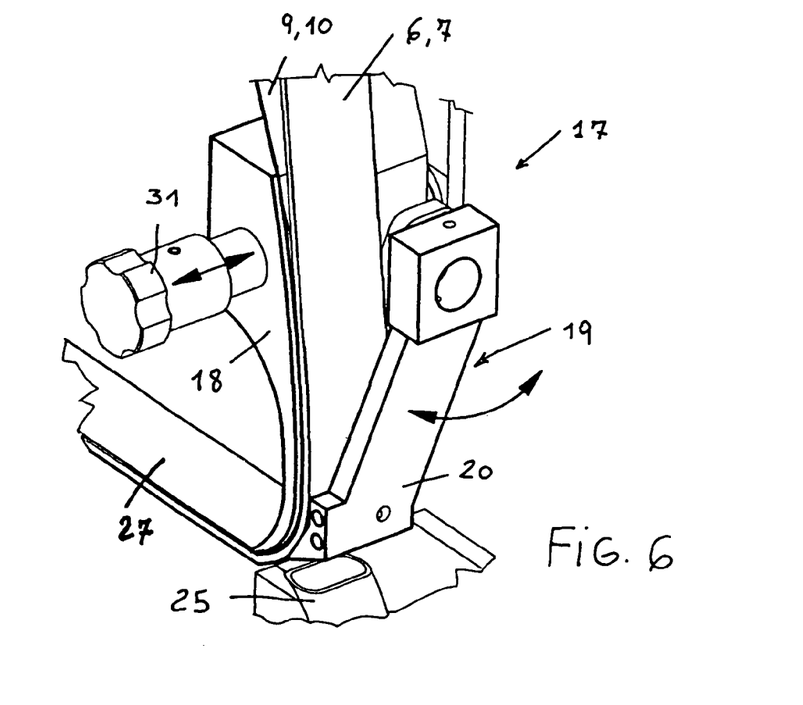
FIG. 6 is a further schematic perspective view of the adhesive applying module.

The top hot air delivery device 19 comprises a swinging block 20, including a hot air duct 21, coupled to a top air overheating element 22.

The bottom end portion of said swinging block 20 comprises a delivery spout 23, designed for conveying a hot air flow 24 on the adhesive processed resilient assembly 6, 7 and on the second adhesive 9-paper 10 assembly.

Thus, the overlapping material strips are suitably heated.

The hot guide 18, in turn, comprises a position adjusting device for centering said hot guide 18, said adjusting device comprising a knob or handle 31 designed for operating a centering screw element associated with said hot guide.

At this position, is conveyed the fabric material 27, which is suitably heated by a bottom hot air delivery device 25, which is in turn supplied with overheated air by a bottom air overheating device 26.

Figure 7:
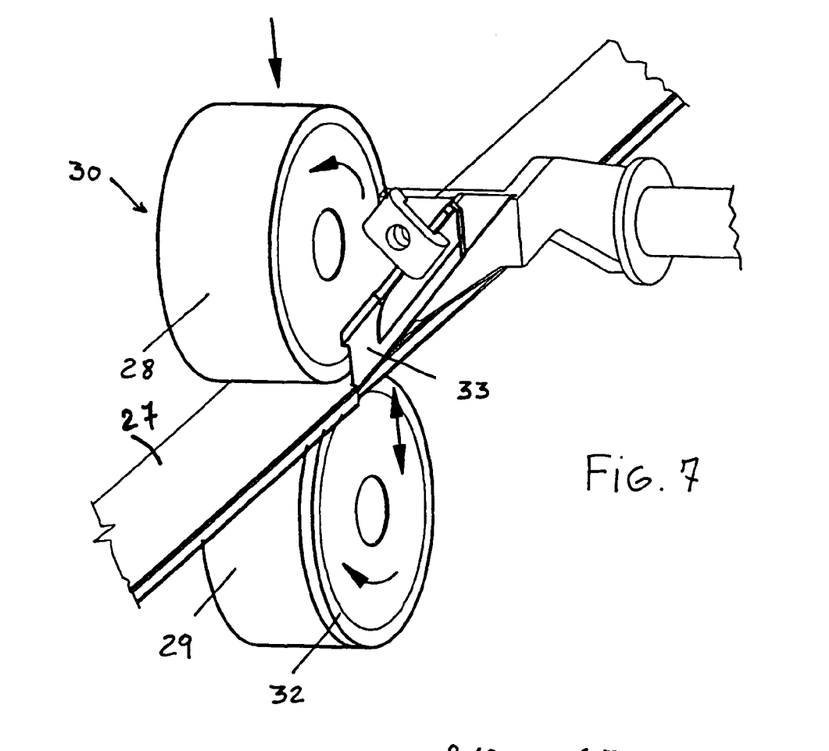
FIG. 7 is yet another schematic perspective view of a feeding, pressing and trimming device included in the hemming system according to the present invention.

Then, the fabric material 27 coupled to the adhesive material 7, is subjected to a pressing operation, at a pair of pressing wheels 28 and 29 of a feeding and pressing device 30.

As stated, the fabric material 27, before entering the space under said wheels 28 and 29, is heated at its bottom portion.

In the mentioned feeding and pressing device 30, the fabric material 27 is coupled to the first adhesive material 7 of the mentioned resilient element 6.

The second adhesive material 9 is on the other hand still covered by its silicone processed paper material 10.

The two pressing wheels 28 and 29, which practically form a pair of calendaring rollers, comprise a resilient covering layer.

The bottom wheel or roller 29, on an outer portion thereof, bears a rotary cutting counter-blade 32, cooperating with a top knife 33, which is driven by a reciprocating movement.

The knife 33, in particular, is designed for trimming away the exceeding fabric material.

Downstream of the disclosed apparatus, the adhesively processed resilient element 6 is cut by a cutting device 34, including a guillotine cutting blade.

In this connection, it should be pointed out that the disclosed inventive system allows to perform the following operating steps.

P1) Applying an adhesive layer on a resilient or elastic element.

P2) Removing from P1 the silicone processed coating paper layer.

P3) Coupling a second adhesive layer on an adhesively processed resilient element, by hot guides and air.

P4) Applying an adhesively processed resilient element on a fabric material, by a hot air bottom heating operation, a front pre-heating operation, and a pressing between the rollers and cutting away of the exceeding fabric material.

P5) Cutting the resilient element by a guillotine type of cutter.

FIGS. 13 to 17 show some exemplary embodiments which can be made by the above disclosed hemming method and system.

In this connection it should be apparent that the disclosed embodiment can be subjected to several modifications and variations, in particular with respect to the operating step for applying the adhesive material to the web or strip material.

Figure 8:
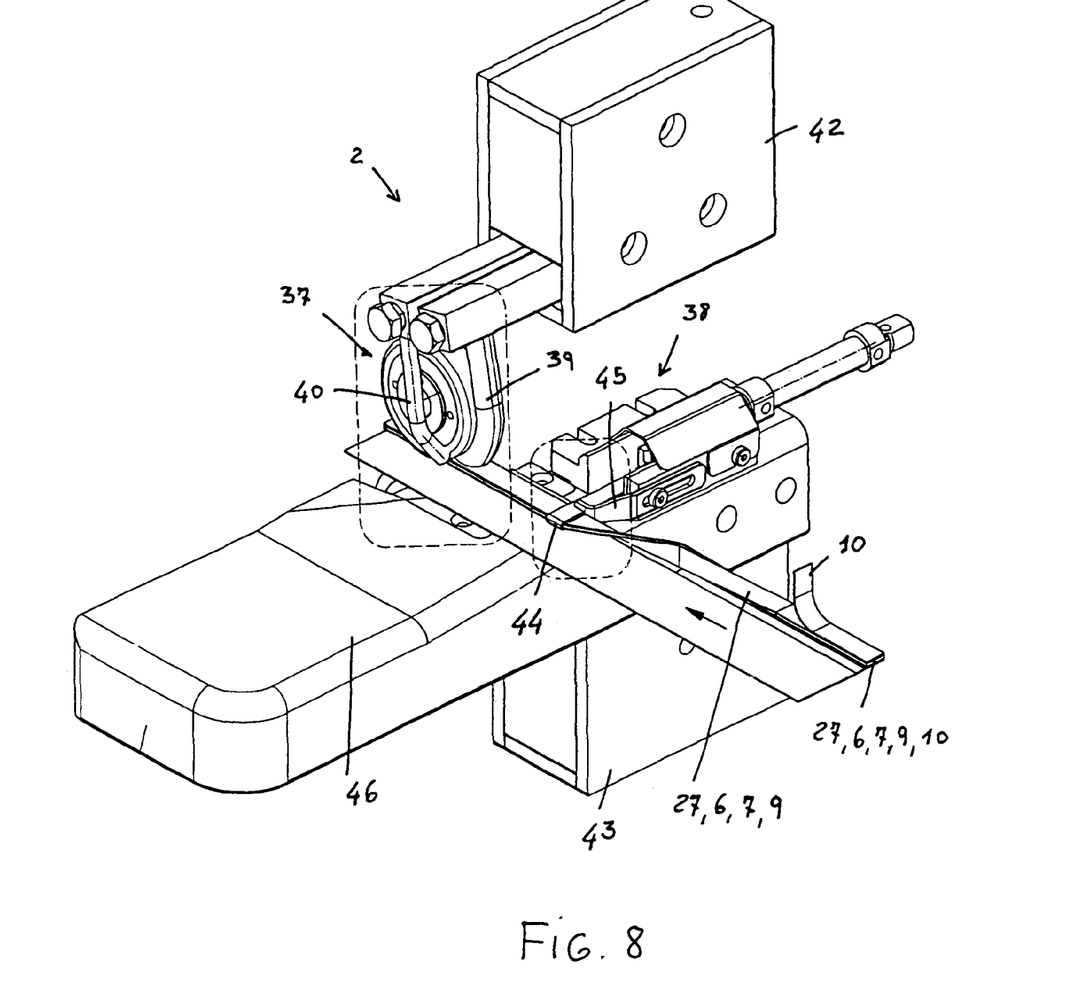
FIG. 8 is yet another schematic perspective view showing a second hemming module or unit included in the hemming system according to the present invention.

The hemming system according to the present invention further comprises an integrating second module or unit 2, provided for hemming the fabric material 27 at the resilient element 6 applied by the first module 1.

More specifically, the second hemming module or unit 2 comprises a feeding and pressing device 37, arranged downstream of the folding device 38.

Figure 9:
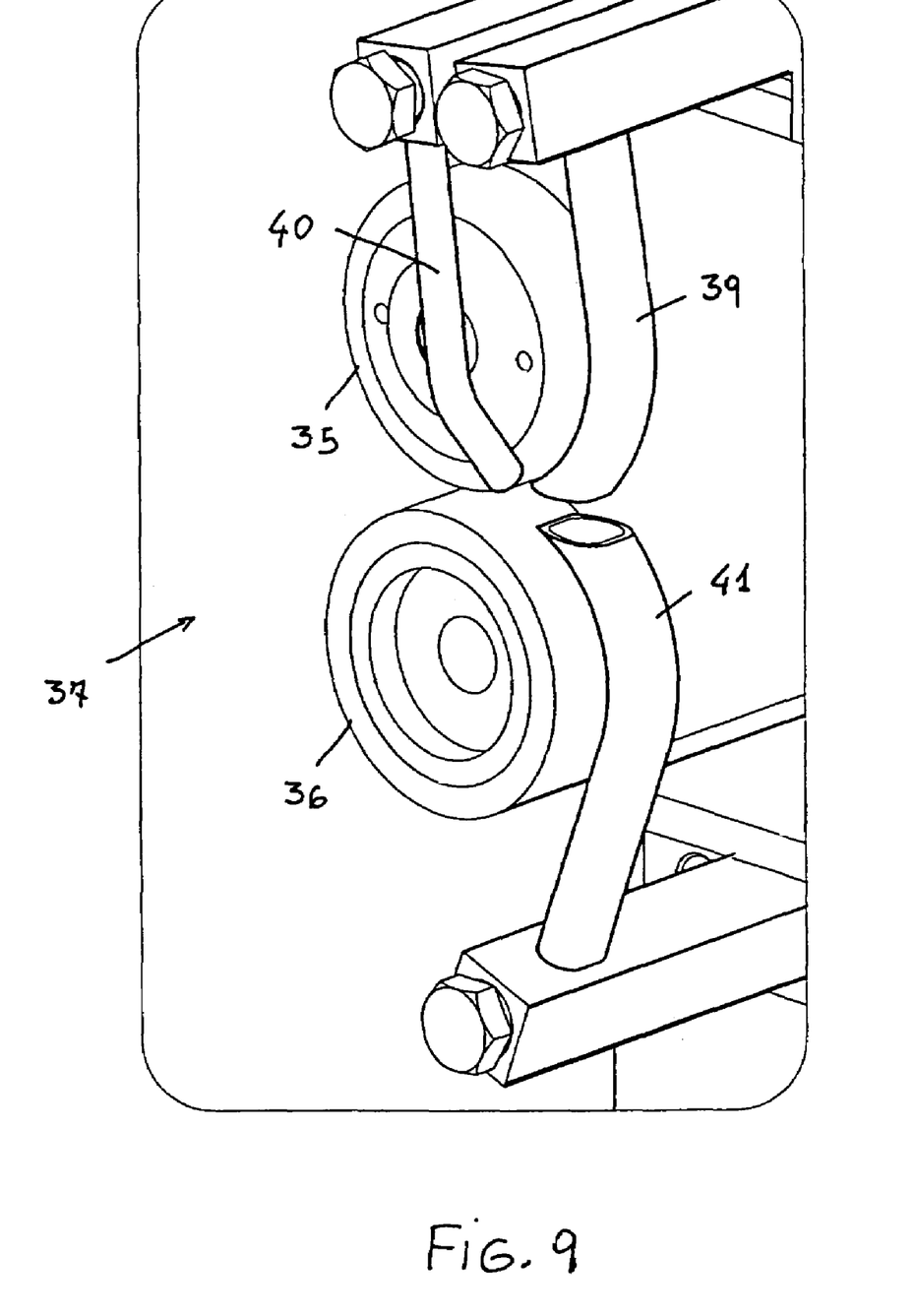
FIG. 9 is an enlarged-scale perspective view, showing a feeding, hot air blowing and pressing device associated with the hemming module.
Figure 12:
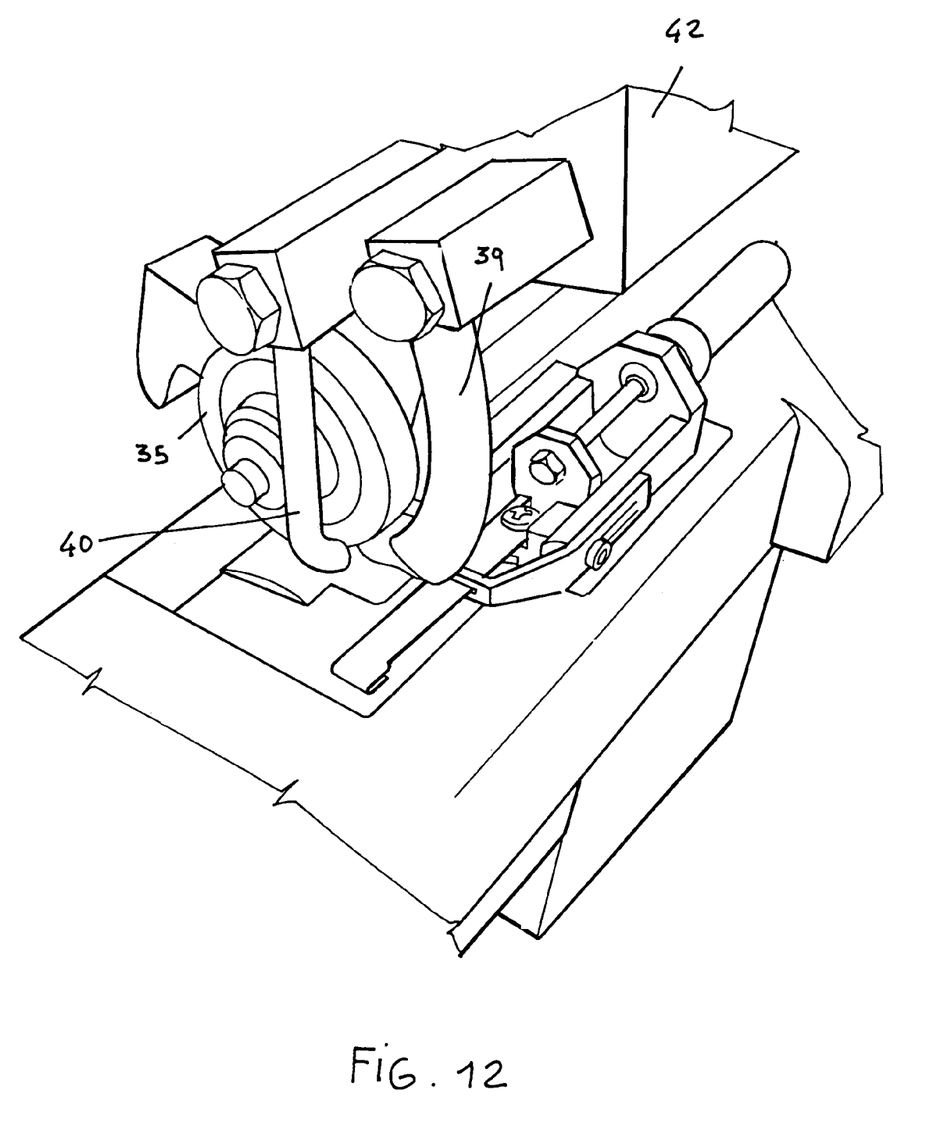
FIG. 12 is yet another perspective view, on a further enlarged scale, showing in further details the feeding and pressing device included in the hemming module.
Figure 13:
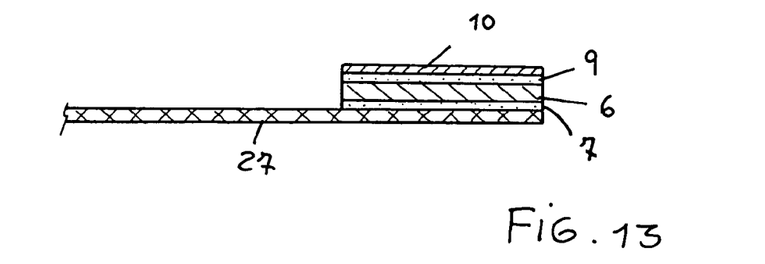
FIGS. 13-17 show different embodiments for applying the resilient or elastic element to the fabric material.
Figure 14:
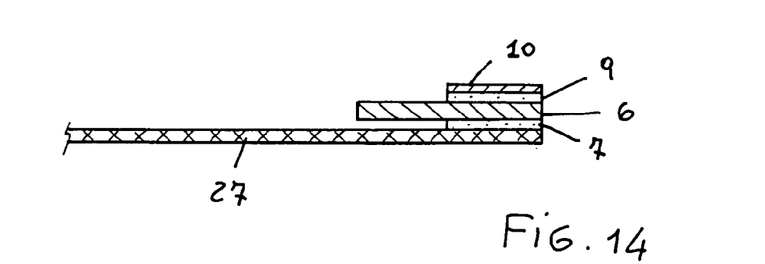
Figure 15:
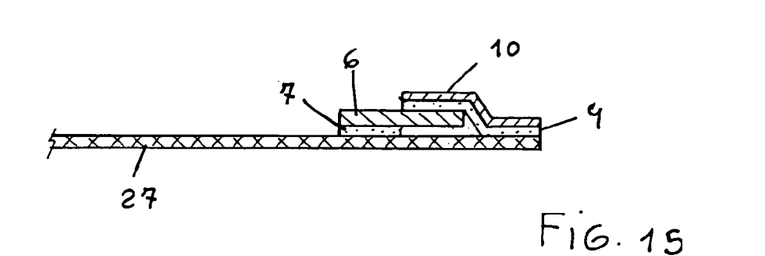
Figure 16:
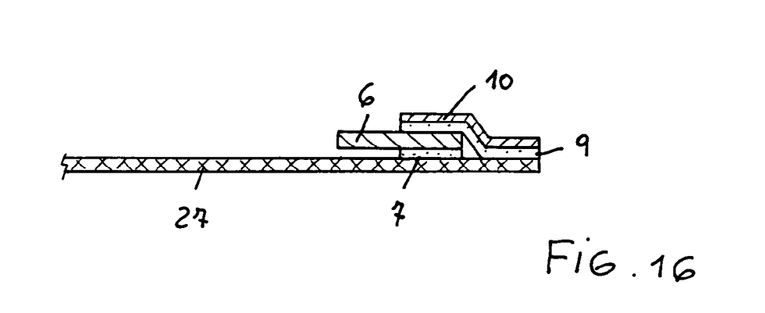
Figure 17:
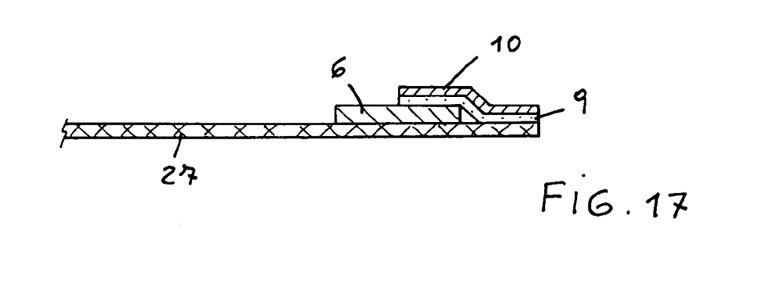
Figure 18:
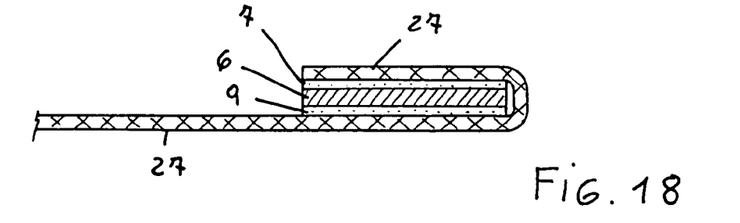
FIGS. 18 to 22 show some embodiments for performing the hemming operations in the hemming system according to the present invention.
Figure 19:
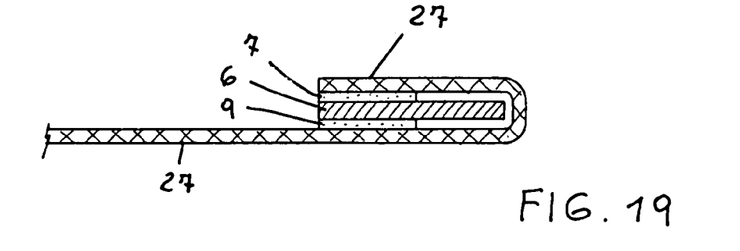
Figure 20:
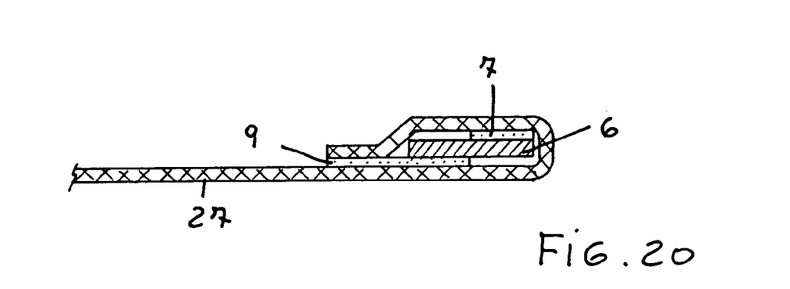
Figure 21:
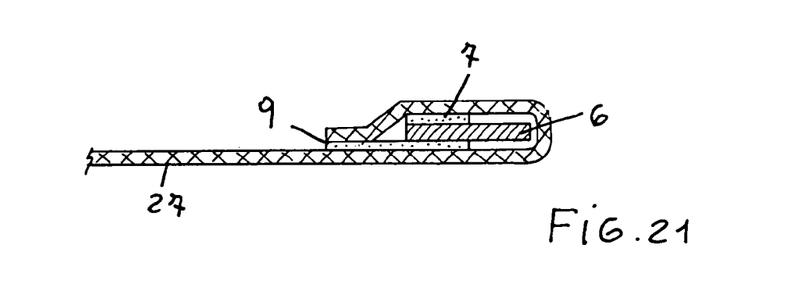
Figure 22:
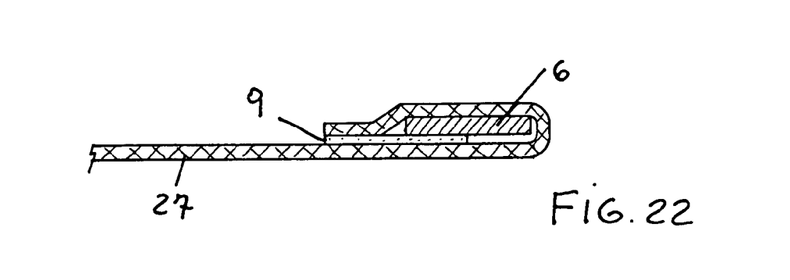

The feeding and pressing device 37 comprises a pair of wheels 35 and 36 including a top hot air conveying duct 39, a side hot air conveying duct 40 and a bottom hot air conveying duct 41.

Said top and side hot air conveying ducts are supplied by a top air overheating device 42, whereas the bottom hot air conveying duct 41 is supplied by a bottom air overheating device 43.

Figure 10:
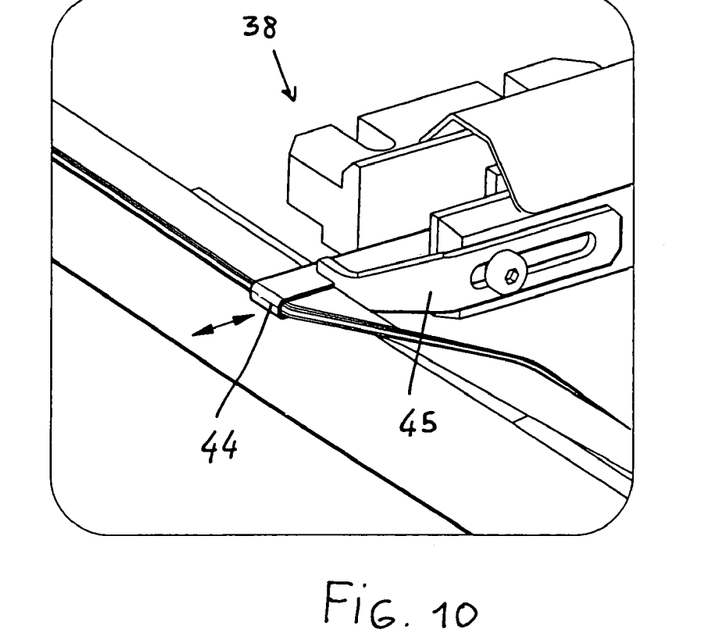
FIG. 10 is a further enlarged-scale perspective view showing a folding device of the hemming module.

The above mentioned folding device 38 comprises, on the other hand, a hemming movable guide 44, coupled to a reference plate 45, constituting an adjustable reference element for defining the folding depth.

The folding device 38 allows the preliminarily formed fabric hem to be properly folded.

As aforesaid, said fabric material is guided in said guides, and conveyed to said pressing rollers where it is properly "welded" or sealed.

Figure 11:
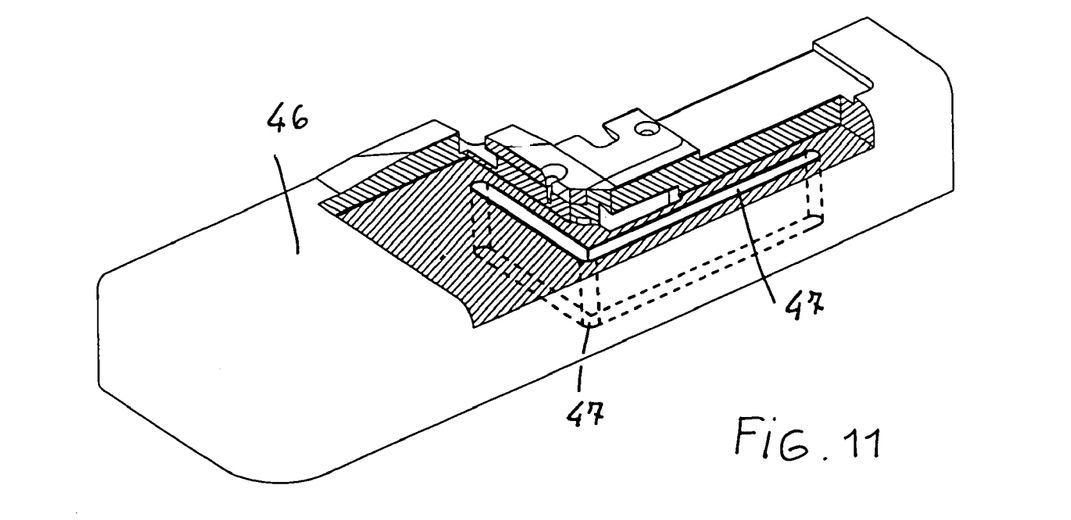
FIG. 11 is a further perspective view showing a working plane or surface of the hemming module.

The second module 2 comprises moreover a working surface or plane 46, including cold air conveying ducts, generally indicated by the reference number 47 for conveying cooling cold air therethrough.

If the disclosed apparatus is deliberately switched off, then, it will provide, in a restarting step, a partial adjustable and programmable withdrawing, thereby assuring a perfect adhesion of the adhesive strip element to the fabric material, even at the stop points.

FIGS. 18 to 22 show some exemplary embodiments of hemming operations which can be made by using the hemming system according to the present invention, and corresponding, respectively to the resilient element applications shown in FIGS. 13 to 17.

In this connection it should be moreover pointed out that the hemming system according to the present invention allows to perform several different types of hemming operations, in addition to those which have been above shown, by way of a merely indicative example.

It has been found that the invention fully achieves the intended aim and objects.

In practicing the invention, the used materials, provided that they are compatible to the contingent requirements, can be any, depending on the needs.

The invention claimed is:

1. A hemming system for hemming a fabric to provide a hemmed fabric with a fabric hemmed edge having such a recovery elastic capability as to return to a start condition as a pulling force applied to said hemmed edge is removed therefrom, said hemming system including:
  adhesive supporting resilient element applying means for applying an adhesive supporting resilient element on a surface or two opposite surfaces of said fabric,
  wherein said hemming system consists of a first adhesive material layer supporting strip applying module for applying two adhesive material layer supporting strips to said resilient element and to said fabric, and
  a second hemming module arranged downstream of said first adhesive material layer supporting strip applying module, for hemming said fabric at said resilient element;
  wherein said first module comprises three bobbins, a first bobbin for supporting said resilient element, a second bobbin for supporting a first adhesive material layer supporting strip supporting a first adhesive material layer protected by a first protective silicone processed paper material and a third bobbin supporting a second adhesive material layer supporting strip supporting a second adhesive material layer protected by a second silicone processed paper material;
  wherein said first adhesive material layer supporting strip applying module further comprises a first adhesive material layer supporting strip applying device, including a pair of pressing rollers for hot applying said first adhesive material layer supporting strip and resilient element of said first and second bobbins, and a second adhesive material layer supporting strip applying device, for connecting said second adhesive material layer supporting strip to said resilient element and to said fabric to be hemmed, said second adhesive material layer supporting strip applying device including a hot guide associated with an adjusting device for centering said hot guide, said adjusting device comprising a knob operating a centering screw associated with said hot guide;
  wherein said second adhesive material layer supporting strip applying device includes a top hot air delivery device, arranged at said hot guide and including a swinging block with a hot air duct, coupled to a top air overheating device, said swinging block having a bottom end portion including a delivery mouth for conveying a hot air flow on said resilient element and on said second adhesive material layer supporting strip-silicone processed paper material assembly;
  wherein said first adhesive material layer supporting strip applying module further comprises protective silicone processed paper material removal means for removing, immediately after having coupled said first and second adhesive material layer supporting strips, said protective silicone processed paper material covering said first and second adhesive material layer supporting strips; and
  wherein said second module includes a feeding and pressing device arranged downstream of a fabric edge portion folding device, said feeding and pressing device including a pair of wheels and a top hot air conveying duct, a side hot air conveying duct and a bottom hot air conveying duct.

2. A hemming system, according to claim 1, wherein said first adhesive supporting strip is so conveyed as to contact a variable temperature heated plate, heated to a temperature from 70° C. to 200° C.

3. A hemming system, according to claim 1, wherein said system comprises a swinging device for removing from said resilient element tensile stresses.

4. A hemming system, according to claim 1, wherein said first module comprises a programmable pulling device for applying to said resilient element an adjustable pulling force.

5. A hemming system, according to claim 1, wherein, as said fabric is conveyed to said applying device, said fabric is heated by a bottom hot air delivery device.

6. A hemming system, according to claim 1, wherein said first module comprises a feeding and pressing device including a pair of wheels for pressing said fabric, coupled to said resilient element, said fabric, before entering a space under said wheels, being at first heated at a bottom part thereof and then coupled to said resilient element, whilst said second adhesive supporting strip being still covered by said silicone processing paper material.

7. A hemming system, according to claim 6, wherein said two wheels of said feeding and pressing device comprises calandering rollers and a covering resilient layer.

8. A hemming system, according to claim 7, wherein a bottom roller of said feeding and pressing device bears, on an outer part thereof, a rotary cutting counter-blade, cooperating with a reciprocatedly driven top knife for cutting through an exceeding fabric.

9. A hemming system, according to claim 8, wherein said hemming system further comprises a guillotine blade cutting device downstream of said first module for cutting through said resilient element.

10. A hemming system, according to claim 1, wherein said top hot air conveying duct is air supplied by a top air overheating device, said bottom hot air conveying duct being air supplied by a bottom air overheating device.

11. A hemming system, according to claim 1, wherein said folding device comprises a hemming movable guide, associated with a reference plate providing an adjustable reference for a folding depth.

12. A hemming system, according to claim 11, wherein said hemming movable guide guides said fabric in a folded condition of said fabric.

13. A hemming system, according to claim 1, wherein said second module further comprises a working plane defining a plurality of conveying ducts for conveying cooling cold air.

* * * * *